United States Patent
Nakanishi et al.

(10) Patent No.: US 10,496,904 B2
(45) Date of Patent: Dec. 3, 2019

(54) BOOK ELECTRONIZATION METHOD AND BOOK ELECTRONIZATION DEVICE

(71) Applicants: SHARP KABUSHIKI KAISHA, Sakai, Osaka (JP); KYOTO UNIVERSITY, Kyoto-shi, Kyoto (JP)

(72) Inventors: Tohru Nakanishi, Sakai (JP); Koji Koyamada, Kyoto (JP); Naohisa Sakamoto, Kyoto (JP)

(73) Assignees: SHARP KABUSHIKI KAISHA, Sakai, Osaka (JP); KYOTO UNIVERSITY, Kyoto-shi, Kyoto (JP)

( * ) Notice: Subject to any disclaimer, the term of this patent is extended or adjusted under 35 U.S.C. 154(b) by 0 days.

(21) Appl. No.: 16/069,301

(22) PCT Filed: Jan. 27, 2017

(86) PCT No.: PCT/JP2017/003014
§ 371 (c)(1),
(2) Date: Jul. 11, 2018

(87) PCT Pub. No.: WO2017/131184
PCT Pub. Date: Aug. 3, 2017

(65) Prior Publication Data
US 2018/0322372 A1 Nov. 8, 2018

(30) Foreign Application Priority Data
Jan. 28, 2016 (JP) .................. 2016-014858

(51) Int. Cl.
*G06F 3/0483* (2013.01)
*G06K 9/72* (2006.01)
*G06T 7/40* (2017.01)

(52) U.S. Cl.
CPC ............. *G06K 9/72* (2013.01); *G06F 3/0483* (2013.01); *G06T 7/40* (2013.01)

(58) Field of Classification Search
CPC .. G06K 9/72; G06K 9/00456; G06K 9/00463; G06K 2209/501; G06F 3/0483;
(Continued)

(56) References Cited

U.S. PATENT DOCUMENTS 6,426,748 B1 * 7/2002 Megahed ................. G06K 9/48
345/419
9,588,651 B1 * 3/2017 Buchanan ............. G06F 3/0483
(Continued)

FOREIGN PATENT DOCUMENTS

CN 102208114 A 10/2011

OTHER PUBLICATIONS

Landon, George V., Duncan Clarke, and Brent W. Seales. "A new technique for the digitization and restoration of deteriorated photographic negatives." EURASIP Journal on Image and Video Processing 2009, No. 1 (2009): 217016. (Year: 2009).*
(Continued)

*Primary Examiner* — Carol Wang
(74) *Attorney, Agent, or Firm* — ScienBiziP, P.C.

(57) ABSTRACT

Information of a character string or the like described on a page of a book is obtained from three-dimensional data of the book. A book electronization device (1) includes a surface specification unit (12) that specifies a page region corresponding to a page of a book in three-dimensional data of the book, which has data values corresponding to a sheet of the book and a gap between sheets, and a data generation unit (13) that maps a character string or graphic in the page region to a two-dimensional plane and generates two-dimensional page data including a character string or graphic written or drawn in the book.

6 Claims, 4 Drawing Sheets

(58) Field of Classification Search
CPC ... G06T 7/40; G06T 7/00; G06T 11/60; G06T 11/00
See application file for complete search history.

(56) References Cited

U.S. PATENT DOCUMENTS

| | | | |
|---|---|---|---|
| 2011/0245660 A1 | 10/2011 | Miyamoto | |
| 2016/0027183 A1* | 1/2016 | Ohi | H04N 1/6005 348/207.1 |
| 2017/0068869 A1* | 3/2017 | Tomisawa | G06K 9/228 |

OTHER PUBLICATIONS

Seales, W. Brent, J. Griffioen, R. Baumann, and M. Field. "Analysis of Herculaneum papyri with x-ray computed tomography." In International Conference on nondestructive investigations and microanalysis for the diagnostics and conservation of cultural and environmental heritage. 2011. (Year: 2011).*

Albertin, Fauzia, Alberto Astolfo, Marco Stampanoni, Eva Peccenini, Yeukuang Hwu, Frédéric Kaplan, and Giorgio Margaritondo. "Ancient administrative handwritten documents: X-ray analysis and imaging." Journal of synchrotron radiation22, No. 2 (2015): 446-451. (Year: 2015).*

Seales, B. W., and Yun Lin. "Digital restoration using volumetric scanning." In Digital Libraries, 2004. Proceedings of the 2004 Joint ACM/IEEE Conference on, pp. 117-124. IEEE, 2004. (Year: 2004).*

Sun, Mingxuan, Ruigang Yang, Yun Lin, George Landon, Brent Seales, and Michael S. Brown. "Geometric and photometric restoration of distorted documents." In null, pp. 1117-1123. IEEE, 2005. (Year: 2005).*

Lin, Yun, and W. Brent Seales. "Opaque document imaging: Building images of inaccessible texts." In Computer Vision, 2005. ICCV 2005. Tenth IEEE International Conference on, vol. 1, pp. 662-669. IEEE, 2005. (Year: 2005).*

Brown, Michael S., Mingxuan Sun, Ruigang Yang, Lin Yun, and W. Brent Seales. "Restoring 2D content from distorted documents." IEEE Transactions on pattern analysis and machine intelligence 29, No. 11 (2007). (Year: 2007).*

Albertin, Fauzia, A. Patera, Iwan Jerjen, S. Hartmann, Eva Peccenini, Frédéric Kaplan, Marco Stampanoni, Rolf Kaufmann, and G. Margaritondo. "Virtual reading of a large ancient handwritten science book." Microchemical Journal 125 (2016): 185-189. (Year: 2016).*

Takayuki Itoh and Koji Koyamada, Automatic Isosurface Propagation Using an Extrema Graph and Sorted Boundary Cell Lists, IEEE Transactions on Visualization and Computer Graphics, vol. 1, No. 4, Dec. 1995.

Vito Mocella et al. Revealing letters in rolled Herculaneum papyri by X-ray phase-contrast imaging, Nature Communications, Jan. 20, 2015.

* cited by examiner

BOOK ELECTRONIZATION METHOD AND BOOK ELECTRONIZATION DEVICE

TECHNICAL FIELD

The present invention relates to a technique of generating page data of a book.

BACKGROUND ART

When a book is opened for reading, the book is damaged in some cases. In particular, an old book may be damaged or destroyed when being opened. For example, an ancient rolled document that was burnt by the eruption in ancient Roman times was discovered in Italy. The ancient document is difficult to be interpreted with unaided eyes because it is entirely blackish, and is difficult to be unrolled because it is fragile.

NPL 1 describes that Greek letters written in the rolled ancient document that was burnt by the eruption were extracted from the ancient document. It is reported in NPL 1 that three-dimensional data of the ancient document was generated by X-ray phase-contrast tomography and pixel patterns considered to be isolated Greek letters were found in the three-dimensional data.

NPL 2 describes a technique of visualizing three-dimensional data. In the technique of NPL 2, an isosurface having a specific data value is automatically specified from three-dimensional data having distribution of continuous data values.

CITATION LIST

Non Patent Literature

NPL 1: Vito Mocella et. al., "Revealing letters in rolled Herculaneum papyri by X-ray phase-contrast imaging", NATURE COMMUNICATIONS, 6:5895 doi: 10.1038/ncomms6895 (2015)

NPL 2: Takayuki Itoh et. al., "Automatic Isosurface Propagation Using an Extrema Graph and Sorted Boundary Cell Lists", IEEE TRANSACTIONS ON VISUALIZATION AND COMPUTER GRAPHICS, VOL. 1, NO. 4, DECEMBER 1995

SUMMARY OF INVENTION

Technical Problem

However, NPL 1 describes that isolated letters were extracted, but does not describe that a word or a sentence was extracted. It is considered that the reason why a character string is difficult to be extracted is that a page region in the three-dimensional data of the ancient rolled document is not specified accurately.

An object of the invention is to obtain information of a character string or the like described on a page of a book from three-dimensional data of the book.

Solution to Problem

A book electronization method according to an aspect of the invention is a method including the steps of: using three-dimensional data of a book, which has data values corresponding to a sheet of the book and a gap between sheets, and specifying a page region corresponding to a page of the book in the three-dimensional data; and mapping a character string or graphic in the page region to a two-dimensional plane and generating two-dimensional page data including a character string or graphic written or drawn in the book.

A book electronization device according to an aspect of the invention includes: a region specification unit that uses three-dimensional data of a book, which has data values corresponding to a sheet of the book and a gap between sheets, and specifies a page region corresponding to a page of the book in the three-dimensional data; and a data generation unit that maps a character string or graphic in the page region to a two-dimensional plane and generates two-dimensional page data including a character string or graphic written or drawn in the book.

Advantageous Effects of Invention

According to an aspect of the invention, it is possible to obtain information of a character string or the like described on a page of a book from three-dimensional data of the book.

DESCRIPTION OF EMBODIMENTS

Embodiment 1

(Three-Dimensional Data of Book)

A target book may be a scroll in which one sheet is rolled, a book in which a plurality of sheets are bound, or one in which a plurality of sheets are not bound but stacked. A sheet of the book is generally paper, but the sheet is not limited thereto and may be plastic or the like.

First, three-dimensional data of the book is prepared. When the book in a closed state is imaged by an X-ray phase-contrast tomographic device, three-dimensional data (volume data) of the book is able to be obtained. The three-dimensional data is a three-dimensional image in which each point in a three-dimensional space has a data value and which represents the book. The data value is a scalar value according to a substance at a position thereof. Note that, each coordinate of the three-dimensional data may have two or more values (for example, a pixel value by a first wavelength and a pixel value by a second wavelength). The three-dimensional data includes information of a plurality of sheets that are stacked, a gap (air) between sheets, and ink (character) on a sheet. A resolution (resolving power) of the three-dimensional data is smaller than a thickness of a sheet and a width of the gap. That is, a pitch of coordinates is smaller than the thickness of the sheet and the width of the gap. It is preferable that the resolution of the three-dimensional data is small enough to allow a character written in the book to be recognized. Here, for simplification, each point of the three-dimensional data is set to have a data value in a range of 0 or more and 10 or less. Description will be given by assuming that a data value not less than 6 and less than 9 corresponds to ink, a data value not less than 3 and less than 6 corresponds to a sheet, and a data value not less than 0 and less than 3 corresponds to a gap (air) between sheets. Note that, a data value not less than 9 corresponds to another part. A correspondence relation between a data value and a substance is able to be decided by imaging a sample book. Note that, such three-dimensional data is also able to be obtained by X-ray tomography other than the X-ray phase-contrast tomography.

(Configuration of Book Electronization Device)

Figure 1:
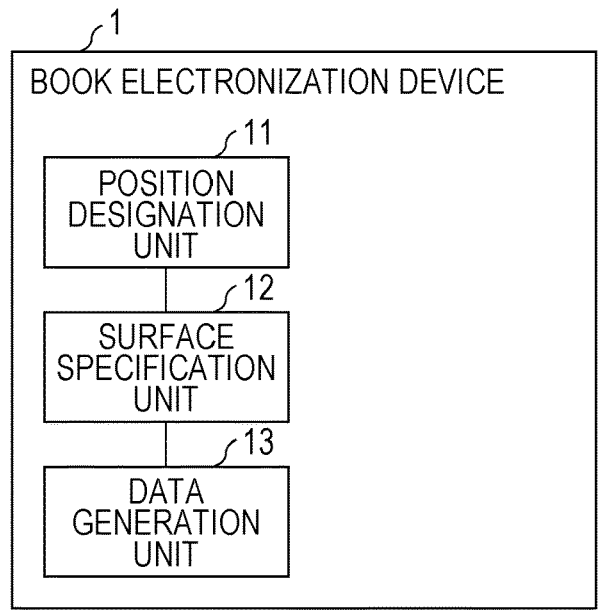
FIG. 1 is a block diagram illustrating a configuration of a book electronization device according to an embodiment of the invention.

FIG. 1 is a block diagram illustrating a configuration of a book electronization device 1 of the present embodiment. The book electronization device 1 includes a position designation unit 11, a surface specification unit 12 (region specification unit), and a data generation unit 13. Three-dimensional data is input to the book electronization device 1 in advance. A detailed operation of the book electronization device 1 will be described later.

On the basis of data values of the three-dimensional data, the position designation unit 11 designates an initial point for specifying a page region. The position designation unit 11 outputs information of the initial point to the surface specification unit 12.

The surface specification unit 12 specifies a page region including the designated initial point. The surface specification unit 12 outputs a set of points corresponding to the page region and data values of the points to the data generation unit 13.

The data generation unit 13 converts data of the specified page region into two-dimensional (planar) page data. The page data has information about a positional relation of a plurality of characters or graphics (arrangement of the characters or the like) in a page of a book.

(Flow of Page Data Generation Processing)

Figure 2:
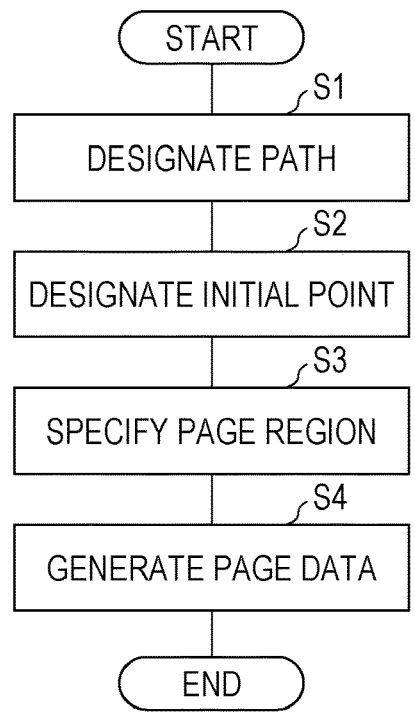
FIG. 2 illustrates a processing flow in the book electronization device.

FIG. 2 illustrates a processing flow in the book electronization device 1.

(Designation of Initial Point)

Figure 3:
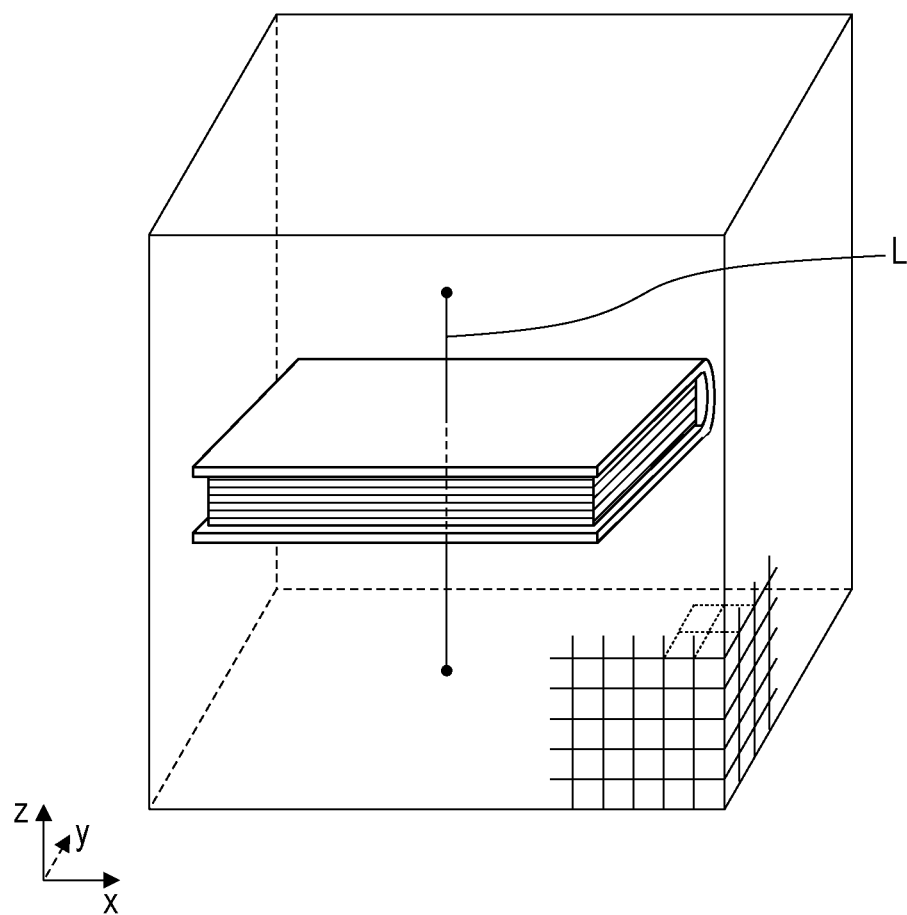
FIG. 3 is a perspective view illustrating three-dimensional data of a target book.

FIG. 3 is a perspective view illustrating three-dimensional data of a target book. The three-dimensional data of the book includes regions of a plurality of sheets and a region of a gap between sheets. Therefore, it is inefficient to scan all data of the three-dimensional data and search for a region of one sheet.

The position designation unit 11 designates a linear path L so that the linear path L crosses at least one page in the three-dimensional data (S1). The path L may be simply a straight line or may be a curved line. The path L may be decided in advance or may be selected by a user from among a plurality of given paths. For example, when a path L passing through a front cover and a back cover is designated, the path L is considered to cross all pages of the book. Thus, the position designation unit 11 is able to efficiently specify one point in each page compared to a case of scanning all data of the three-dimensional data.

A threshold (here, 3) for distinguishing a data value of a sheet and a data value of a gap is set to the position designation unit 11. Since a page is one side of a sheet, a region (page region) corresponding to the page is at a position corresponding to a boundary between the sheet and the gap. When a data value is seen along the path L, the data value exceeds the threshold and changes at a position where the path L crosses a page. The position designation unit 11 refers to the data value along the path L and designates a point, at which the data value corresponds to the threshold, as the initial point of the page region (S2). In a case where the path L crosses a plurality of pages, the position designation unit 11 may designate a plurality of initial points corresponding to a plurality of page regions.

(Specification of Page Region)

Figure 4:
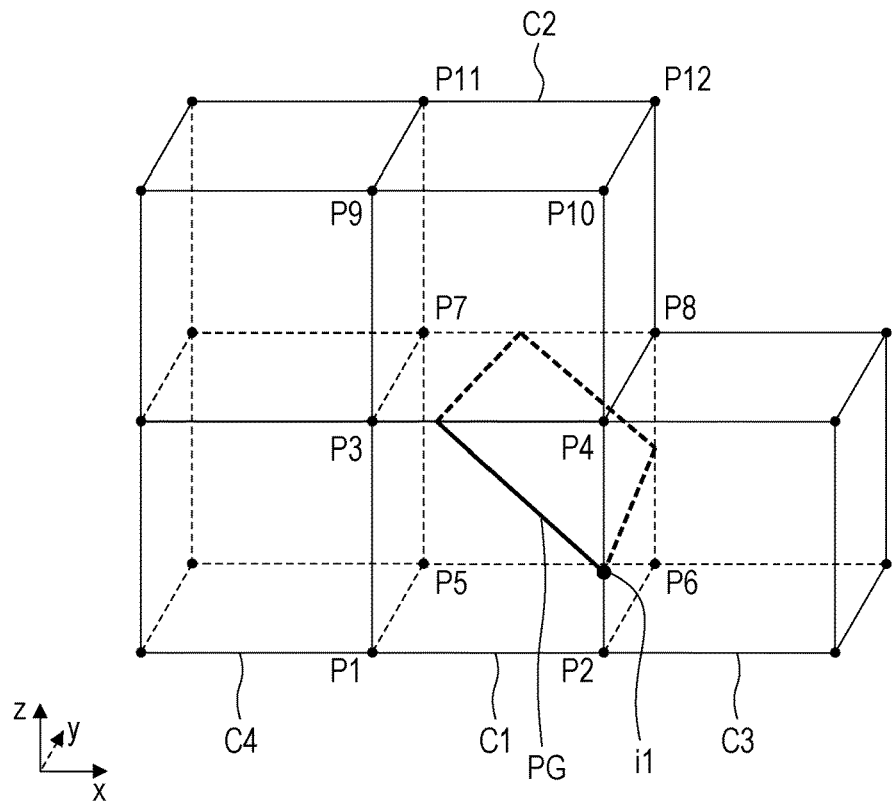
FIG. 4 is a partially enlarged view of the three-dimensional data.

FIG. 4 is a partially enlarged view of the three-dimensional data. A point i1 between a point P2 and a point P4 is designated as an initial point by the position designation unit 11. A unit cell C1, which includes the initial point i1, in an orthogonal coordinate system is focused on. The unit cell C1 is a rectangular solid (cube) having eight points P1 to P8 as apexes. For example, in a case where the data value of the point P2 is larger than the threshold and the data value of the point P4 is smaller than the threshold, the initial point i1 (that is, a point corresponding to a page region) whose data value corresponds to the threshold is considered to exist between the point P2 and the point P4. A page region PG includes the initial point i1 and extends planarly (in a plane manner or curvilinear manner) from the initial point i1. Thus, the page region PG is considered to pass through the unit cell C1 that includes the initial point i1.

The surface specification unit 12 focuses on the unit cell C1 that includes the initial point i1, and specifies a plurality of sides of the unit cell C1, through which the page region PG passes. For example, in a case where the data value of one of two apexes (P3 and P4) which are adjacent along a coordinate axis is not less than the threshold and the data value of the other apex is less than the threshold, the surface specification unit 12 determines that the page region PG passes between the two apexes (side P3-P4). In the unit cell C1, the page region PG passes through a side P2-P4, the side P3-P4, a side P6-P8, and a side P7-P8.

Since the page region PG passes through the side P3-P4, the page region PG passes through another unit cell C2 (unit cell adjacent to C1) that includes the side P3-P4. The page region PG also passes through another unit cell C3 that includes the side P2-P4. The surface specification unit 12 specifies sides of the unit cells C2 and C3, through which the page region PG passes, in a similar manner to the case of the unit cell C1. In this manner, the surface specification unit 12 performs similar determination for other cells each of which includes sides through which the page region PG is determined to pass. Thereby, the surface specification unit 12 is able to specify the unit cells through which the page region PG pass. Here, the surface specification unit 12 does not need to perform determination for all cells adjacent to the focused unit cell C1 and is able to omit determination for a unit cell C4 or the like through which the page region PG is not considered to pass.

The surface specification unit 12 specifies a position of the page region PG (S3). For example, the surface specification unit 12 may specify, as a point corresponding to the page region PG, one apex of a side through which the page region PG passes, a data value of which is not less than the threshold (data value of which corresponds to a sheet or ink).

Alternatively, the surface specification unit 12 may specify any apex of the side, the data value of which is close to the threshold, as the point corresponding to the page region PG.

Alternatively, the surface specification unit 12 may specify a point that internally divides the side at a "difference between the threshold and the data value of one point": a "difference between the threshold and the data value of the other point" as the point corresponding to the page region PG. The surface specification unit 12 may decide a data value of such an intermediate point by interpolation according to data values of peripheral points.

By automatically searching for an isosurface including the initial point i1 from the initial point i1 that is designated, the surface specification unit 12 is able to accurately specify the page region PG corresponding to the initial point i1. The isosurface is a set of points, the data values of which are the same, in a scalar field defined in a three-dimensional space. The surface specification unit 12 may specify an isosurface (isovolume) in which data values are in a given range. In a case where the number of data points in the three-dimensional data is the third power of N, the surface specification unit 12 is able to specify one page region PG by searching for a data point on an order of the second power of 2.

Note that, the page region PG in the three-dimensional space may be a surface that includes fine irregularity. Before providing the data generation unit 13 with the specified page region PG, the surface specification unit 12 may perform smoothing for the page region PG that includes irregularity to convert the page region PG into a page region that has a smooth curved surface. Additionally, the surface specification unit 12 may move the page region PG in parallel toward an inner side of the sheet or an outer side of the sheet. For example, in a case where ink permeates inside the sheet, by moving the page region PG, which indicates a surface of the sheet, in parallel toward the inner side of the sheet, the page region PG is able to more reliably include information of a character or the like represented by the ink. In a case where ink is formed in a protruding manner on the surface of the sheet, by moving the page region PG in parallel toward the outer side of the sheet, the page region PG is able to more reliably include information of a character or the like represented by the ink.

(Generation of Page Data)

A sheet of a book (in particular, sheet of an old book) that is imaged may be curved. Thus, the specified page region PG may be a curved surface in the three-dimensional space. The data generation unit 13 converts data of the page region PG into two-dimensional (planar) page data. Specifically, the data generation unit 13 maps the data values of the respective points of the page region PG to a two-dimensional plane and thereby generates page data (S4). Data values of respective points of the two-dimensional page data roughly correspond to a sheet or ink. In a case where the page region PG is a surface with a hole, a data value of a part corresponding to the hole in the two-dimensional page data may be a different value (such as a value corresponding to a gap). Of course, the two-dimensional page data may include a point with a different data value. Note that, a known method (for example, three-dimensional mesh deployment utilizing saddle point characteristics) is able to be used as a method of mapping.

The two-dimensional page data generated by the data generation unit 13 has information about a positional relation of a plurality of characters or graphics in a page of the book. The two-dimensional page data is able to be considered as indicating an image of one page of the book. A character string or a graphic included in the page is indicated by placement of data values corresponding to ink. That is, the page data includes the character string (a plurality of characters that are arrayed) or a graphic written or drawn on the page of the book. For example, when a display device displays a data value corresponding to a sheet and a data value corresponding to ink in different gradation or different colors, an image of one page of the book is able to be displayed so as to be visible for a user. For visibility of the page data, the data generation unit 13 may convert each of the data values into data of a corresponding gradation or color.

Additionally, the data generation unit 13 may extract characters from the two-dimensional page data by pattern matching or the like and convert the extracted characters into text data (character code). Thereby, the data generation unit 13 is able to obtain page data in which the character string written on the page of the book is indicated by the text data.

Description has been given above for a flow of obtaining page data of one page of the book. The position designation unit 11 is able to designate a plurality of initial points corresponding to a plurality of page regions. Therefore, when the surface specification unit 12 and the data generation unit 13 perform similar processing for another initial point, the data generation unit 13 is able to generate page data of another page. The surface specification unit 12 is able to specify a surface (one side) of a thick sheet as a page region PG. Thus, by specifying two page regions PG from two initial points corresponding to front and back sides, the surface specification unit 12 is able to specify individual page regions of the both sides of the sheet. The data generation unit 13 may associate a plurality of pieces of page data that are obtained with page numbers in accordance with arrangement of a plurality of initial points on the path L or arrangement of a plurality of page regions PG that are specified. In this manner, the book electronization device 1 is able to generate, from the three-dimensional data of the book, the plurality of pieces of page data corresponding to the plurality of pages of the book.

The book electronization device 1 of the present embodiment specifies continuous page regions corresponding to one page in three-dimensional data. The book electronization device 1 generates two-dimensional page data from data values of the specified page regions. The page data includes information about arrangement of a plurality of characters (character string) or a graphic written or drawn on the page of the book. Since the page data is generated on the basis of the page regions that are accurately specified, even when there is noise, the character string or the like on the page data is able to be accurately recognized. Thus, the book electronization device 1 is able to easily obtain information of the character string or the graphic written or drawn in the original book from the page data. As a result, the book electronization device 1 enables reading not only an isolated character but also a word or sentence that is formed by a plurality of characters written in the book. The user is able to easily recognize the character string or the like in page data displayed on the display device or the like.

According to the book electronization device 1 of the present embodiment, page data including information of a character, a graphic, or the like written (drawn) on a page of a book is able to be generated from three-dimensional data of the book. When the three-dimensional data is generated, the book does not need to be opened and a sheet of the book may be in a curved state. Thus, information written in an old document that may be destroyed when being opened is able to be electronized without the old document being damaged. According to the book electronization device 1, since it is not necessary to scan each page of the book with a scanner or the like, not only an old document but also a book is able to be easily electronized. By efficiently electronizing a document that was published in the past and has no electronic data, even when a cultural asset (document) is lost due to disaster or the like by any possibility, the content thereof is able to be reproduced. When the book electronization device 1 is applied to a photograph album, the photograph album is also able to be electronized.

Modified Example

Note that, depending on a type of a sheet or ink used for writing a character, a data value corresponding to a sheet or ink in three-dimensional data obtained through X-ray phase-contrast tomography may vary. A plurality of thresholds for distinguishing a sheet, ink, and a gap (air) are appropriately set depending on a type of a sheet or ink.

Note that, the position designation unit 11 may receive designation of an initial point by the user. The position designation unit 11 may display three-dimensional data of a book on the display device and the user may designate, as an initial point, a point which is considered as a surface (page region PG) of a sheet.

Note that, in the book electronization device, an initial point may not be designated and the surface specification unit may specify, as a page region, a set of points each having a data value close to the threshold, for example.

Embodiment 2

Another embodiment of the invention will be described. Note that, for convenience of description, members having the same functions as those of the members described in the aforementioned embodiment will be given the same reference signs and description thereof will be omitted. In the present embodiment, a book electronization device specifies a page region after performing preprocessing for three-dimensional data.

Figure 5:
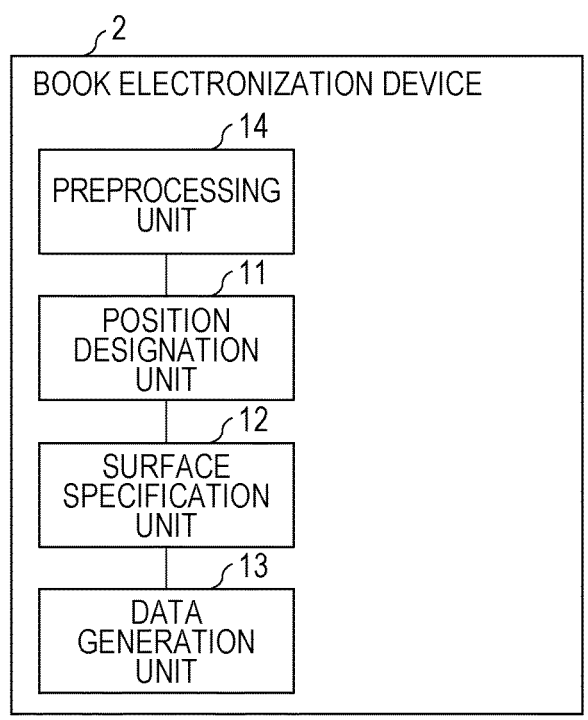
FIG. 5 is a bock diagram illustrating a configuration of a book electronization device according to another embodiment of the invention.

FIG. 5 is a block diagram illustrating a configuration of a book electronization device 2 of the present embodiment. The book electronization device 2 includes a preprocessing unit 14, the position designation unit 11, the surface specification unit 12, and the data generation unit 13.

Figure 6:
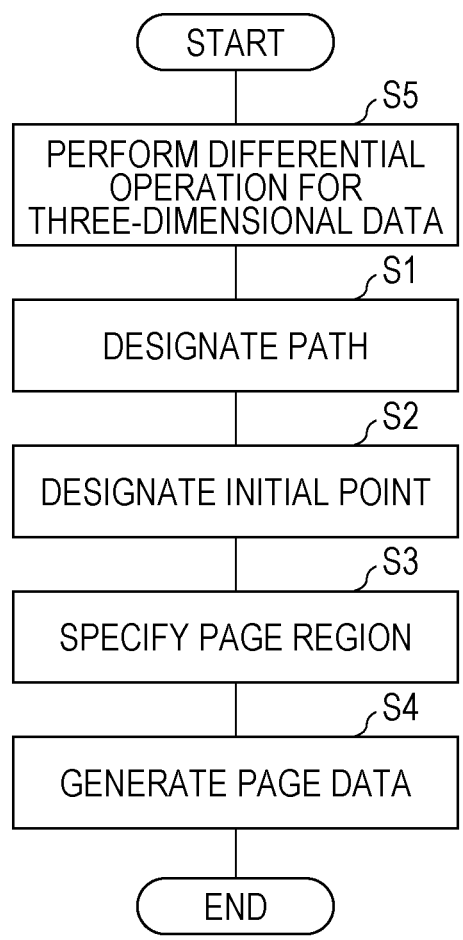
FIG. 6 illustrates a processing flow in the book electronization device.

FIG. 6 illustrates a processing flow in the book electronization device 2. Before the processing (S1) in which the position designation unit 11 designates a path, processing (S5) of a differential operation by the preprocessing unit 14 is added.

The preprocessing unit 14 performs a differential operation as preprocessing for three-dimensional data of a book and thereby generates three-dimensional data subjected to the differential operation. In the differential operation, a part in which a change (gradient) of a data value is greater is converted to have a larger value. Normally, the data value is considered to suddenly change at a boundary between sheets or the like. The three-dimensional data subjected to the differential operation is considered to have a large value in a region corresponding to the boundary and have a relatively small value in another region. This makes it possible for the book electronization device 2 to accurately specify a page region corresponding to a surface of a sheet. The preprocessing unit 14 outputs the three-dimensional data subjected to the differential operation to the position designation unit 11.

The position designation unit 11 specifies a linear path so that the linear path crosses at least one page, for example, as in the embodiment described above. The position designation unit 11 refers to values of the three-dimensional data subjected to the differential operation along the path and designates, as an initial point of a page region, a point at which the value exceeds a given threshold or a point at which the value is the maximum value. The initial point corresponds to a page serving as the surface of the sheet.

The surface specification unit 12 specifies a page region corresponding to the initial point. For example, from among points adjacent to the initial point, the surface specification unit 12 specifies a point at which the value in the three-dimensional data subjected to the differential operation exceeds the given threshold as a point that constitutes the page region. The surface specification unit 12 performs similar determination for points adjacent to the point that constitutes the page region.

Alternatively, the surface specification unit 12 may specify the page region by a similar method to that of Embodiment 1 on the basis of the designated initial point and data values of the three-dimensional data before the differential operation.

In a similar manner to that of Embodiment 1, the data generation unit 13 maps the data values (before the differential operation) corresponding to the specified page region to two-dimensional page data.

According to the book electronization device 2 of the present embodiment, a surface of a sheet is able to be accurately specified as a page region. Thus, information of a word or sentence written in a book is able to be accurately obtained.

Embodiment 3

Control blocks (particularly, the position designation unit 11, the surface specification unit 12, the data generation unit 13, and the preprocessing unit 14) of the book electronization device 1 or 2 may be realized by a logic circuit (hardware) provided in an integrated circuit (IC chip) or the like or may be realized by software with use of a CPU (Central Processing Unit).

In the latter case, the book electronization device 1 or 2 includes a CPU that executes a command of a program that is software realizing each of the functions, a ROM (Read Only Memory) or a storage device (each referred to as a "recording medium") in which the program and various kinds of data are stored so as to be readable by a computer (or a CPU), a RAM (Random Access Memory) that develops the program, and the like. An object of the invention is achieved by a computer (or a CPU) reading and executing the program from the recording medium. An example of the recording medium includes a "non-transitory tangible medium" such as a tape, a disk, a card, a semiconductor memory, or a programmable logic circuit. The program may be supplied to the computer via any transmission medium (such as a communication network or a broadcast wave) which allows the program to be transmitted. Note that, the invention can also be achieved in a form of a data signal in which the program is embodied through electronic transmission and which is embedded in a carrier wave.

Conclusion

A book electronization method according to an aspect 1 of the invention is a method including the steps of: using three-dimensional data of a book, which has data values corresponding to a sheet of the book and a gap between sheets, and specifying a page region corresponding to a page of the book in the three-dimensional data; and mapping a character string or graphic in the page region to a two-dimensional plane and generating two-dimensional page data including a character string or graphic written or drawn in the book.

According to the aforementioned configuration, after the page region in the three-dimensional data of the book is specified, the character string or graphic positioned in the page region in the three-dimensional data of the book is mapped to the two-dimensional plane. This makes it possible to obtain the two-dimensional page data including the character string or graphic written or drawn in the book. Thus, content (such as a sentence) written on the page of the book is able to be accurately converted into two-dimensional page data having high readability. As a result, information of the character string or the like described on the page of the book is able to be obtained from the three-dimensional data of the book.

In the aspect 1, a book electronization method according to an aspect 2 of the invention may be a method which includes the step of designating an initial point corresponding to one point on the page in the three-dimensional data, in which, at the step of specifying the page region, the page region including the initial point is specified from the three-dimensional data.

According to the aforementioned configuration, one page region corresponding to the designated initial point is able to be efficiently specified.

In the aspect 2, a book electronization method according to an aspect 3 of the invention may be a method which includes the step of designating a linear path in the three-dimensional data, in which, at the step of designating the initial point, a point at which the path crosses the page region is designated as the initial point on a basis of a data value in the path.

According to the aforementioned configuration, one point in the page region is able to be efficiently designated. Thus, it is possible to shorten processing time and efficiently perform electronization of the book.

In any one of the aspects 1 to 3, a book electronization method according to an aspect 4 of the invention may be a method in which, at the step of specifying the page region, an isosurface corresponding to a threshold that distinguishes a data value of the sheet and a data value of the gap between the sheets is specified.

The isosurface corresponding to the threshold that distinguishes the data value of the sheet and the data value of the gap between the sheets is considered to correspond to a surface of the sheet. Therefore, the surface of the sheet, on which a character or the like exists, is able to be specified.

In the aspect 2 or 3, a book electronization method according to an aspect 5 of the invention may be a method which includes the step of performing a differential operation for the three-dimensional data and generating three-dimensional data subjected to the differential operation, in which, at the step of designating the initial point, the initial point is designated on a basis of values of the three-dimensional data subjected to the differential operation.

A data value is considered to suddenly change at a boundary between the sheet and the gap. By performing a differential operation, the boundary between the sheet and the gap, which corresponds to a page region, is able to be extracted.

A book electronization device according to an aspect 6 of the invention includes: a region specification unit that uses three-dimensional data of a book, which has data values corresponding to a sheet of the book and a gap between sheets, and specifies a page region corresponding to a page of the book in the three-dimensional data; and a data generation unit that maps a character string or graphic in the page region to a two-dimensional plane and generates two-dimensional page data including a character string or graphic written or drawn in the book.

A book electronization device according to each aspect of the invention may be realized by a computer, and in such case, a control program for the book electronization device that causes the book electronization device to be realized by a computer by causing the computer to operate as each unit (software element) of the book electronization device, and a computer-readable recording medium having the control program recorded therein are also included in the scope of the invention.

The invention is not limited to each of the embodiments described above, and may be modified in various manners within the scope indicated in the claims and an embodiment achieved by appropriately combining technical means disclosed in each of different embodiments is also encompassed in the technical scope of the invention.

Further, by combining the technical means disclosed in each of the embodiments, a new technical feature may be formed.

REFERENCE SIGNS LIST 1, 2 book electronization device
11 position designation unit
12 surface specification unit (region specification unit)
13 data generation unit
14 preprocessing unit

The invention claimed is:

1. A book electronization method, comprising the steps of:
using three-dimensional data of a book, which has data values corresponding to a sheet of the book and a gap between sheets, and specifying a page region corresponding to a page of the book in the three-dimensional data;
mapping a character string or graphic in the page region to a two-dimensional plane and generating two-dimensional page data including a character string or graphic written or drawn in the book;
designating an initial point corresponding to one point on the page in the three-dimensional data; and
designating a linear path in the three-dimensional data, wherein
at the step of specifying the page region, the page region including the initial point is specified from the three-dimensional data, and
at the step of designating the initial point, a point at which the path crosses the page region is designated as the initial point on a basis of a data value in the path.

2. The book electronization method according to claim 1, wherein
at the step of specifying the page region, an isosurface corresponding to a threshold that distinguishes a data value of the sheet of the book and a data value of the gap between the sheets is specified.

3. The book electronization method according to claim 1, comprising
the step of performing a differential operation for the three-dimensional data with respect to a position and generating three-dimensional data subjected to the differential operation, wherein
at the step of designating the initial point, the initial point is designated on a basis of values of the three-dimensional data subjected to the differential operation.

4. A book electronization device, comprising:
a region specification unit that uses three-dimensional data of a book, which has data values corresponding to a sheet of the book and a gap between sheets, and specifies a page region corresponding to a page of the book in the three-dimensional data; and a data generation unit that maps a character string or graphic in the page region to a two-dimensional plane and generates two-dimensional page data including a character string or graphic written or drawn in the book;

wherein an initial point corresponding to one point on the page in the three-dimensional data is designated;

wherein the page region including the initial point is specified from the three-dimensional data;

wherein a linear path in the three-dimensional data is designated; and wherein a point at which the path crosses the page region is designated as the initial point on a basis of a data value in the path.

5. A non-transitory computer-readable recording medium having a control program recorded therein, the control program causing a computer to function as the region specification unit and the data generation unit in the book electronization device according to claim 4.

6. The book electronization device according to claim 4, wherein a differential operation for the three-dimensional data with respect to a position is performed and three-dimensional data subjected to the differential operation is generated, wherein the initial point is designated on a basis of values of the three-dimensional data subjected to the differential operation.

* * * * *